(12) United States Patent
Ledieu et al.

(10) Patent No.: US 11,791,686 B2
(45) Date of Patent: Oct. 17, 2023

(54) ROTATING ELECTRICAL MACHINE PROVIDED WITH A BRACKET PRODUCED FROM TWO OVER-MOULDED PARTS

(71) Applicant: Valeo Equipements Electriques Moteur, Creteil (FR)

(72) Inventors: Cédric Ledieu, Créteil (FR); Jean-Claude Labrosse, Créteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 275 days.

(21) Appl. No.: 17/275,077

(22) PCT Filed: Jul. 24, 2019

(86) PCT No.: PCT/EP2019/069861
§ 371 (c)(1),
(2) Date: Mar. 10, 2021

(87) PCT Pub. No.: WO2020/052843
PCT Pub. Date: Mar. 19, 2020

(65) Prior Publication Data
US 2021/0257876 A1    Aug. 19, 2021

(30) Foreign Application Priority Data
Sep. 14, 2018  (FR) ...................... 1858300

(51) Int. Cl.
*H02K 5/15* (2006.01)
*H02K 5/173* (2006.01)
(Continued)

(52) U.S. Cl.
CPC ............ *H02K 5/15* (2013.01); *H02K 5/1732* (2013.01); *H02K 7/083* (2013.01); *H02K 7/116* (2013.01);
(Continued)

(58) Field of Classification Search
CPC ........ H02K 5/15; H02K 5/1732; H02K 7/083; H02K 7/116
(Continued)

(56) References Cited

U.S. PATENT DOCUMENTS 3,463,951 A * 8/1969 Bauerle ................. H02K 5/148
310/83
5,715,901 A * 2/1998 Tokushima ............... F16H 1/06
180/65.6
(Continued)

FOREIGN PATENT DOCUMENTS

DE    0008315    *  7/1981   ............. B60N 3/026
FR    2938131 A1    5/2010
(Continued)

OTHER PUBLICATIONS

Machine translation of EP0008315, Flagmeyer et al. (Year: 1981).*
(Continued)

*Primary Examiner* — Terrance L Kenerly
(74) *Attorney, Agent, or Firm* — Osha Bergman Watanabe & Burton LLP

(57) ABSTRACT

The invention mainly concerns a rotating electrical machine, in particular for a motor vehicle, comprising a bearing (15) comprising a recess (17) for receiving a shaft bearing guiding the rotation of the shaft, characterised in that the bearing (15) comprises: —a first part (15. I) produced from a first material comprising: —the recess (17) for receiving the shaft bearing, —an interface (51) for mounting a bearing (50) of a pinion (49) external to the rotating electrical machine, and —a second part (15.2) produced from a second material comprising: —a transverse wall (53), and —a skirt (54) extending from the transverse wall (53) at least partially
(Continued)

surrounding the stator (11), —the second part (15.2) being overmoulded on the first part (15.1) so as to form a strong bearing (15).

11 Claims, 3 Drawing Sheets

(51) Int. Cl.
    *H02K 7/08*     (2006.01)
    *H02K 7/116*     (2006.01)
    *B60K 1/00*     (2006.01)
    *B60K 6/26*     (2007.10)
    *B60R 16/02*     (2006.01)

(52) U.S. Cl.
    CPC .............. *B60K 1/00* (2013.01); *B60K 6/26* (2013.01); *B60K 2006/268* (2013.01); *B60R 16/02* (2013.01); *B60Y 2200/91* (2013.01); *B60Y 2200/92* (2013.01); *B60Y 2400/47* (2013.01); *B60Y 2400/70* (2013.01)

(58) Field of Classification Search
    USPC ..................................................... 310/90, 83
    See application file for complete search history.

(56) References Cited

U.S. PATENT DOCUMENTS

| | | | | |
|---|---|---|---|---|
| 7,633,198 | B2* | 12/2009 | Kirkman | H02K 5/225 |
| | | | | 310/71 |
| 2015/0188392 | A1* | 7/2015 | Haag | H02K 5/207 |
| | | | | 310/59 |
| 2020/0101831 | A1* | 4/2020 | Huber | H02K 7/108 |

FOREIGN PATENT DOCUMENTS

| | | |
|---|---|---|
| FR | 3058588 A1 | 5/2018 |
| JP | H06-062764 U | 9/1994 |
| JP | H08-294249 A | 11/1996 |
| JP | 2012-080733 A | 4/2012 |
| JP | 2017-184606 A | 10/2017 |
| WO | 2017121930 A1 | 7/2017 |

OTHER PUBLICATIONS

Notification of Reason for Rejection issued in Japanese Application No. 2021-513984, dated Apr. 26, 2022 (8 pages).

International Search Report and Written Opinion in corresponding International Application No. PCT/EP2019/069861, dated Aug. 28, 2019 (11 pages).

* cited by examiner

ROTATING ELECTRICAL MACHINE PROVIDED WITH A BRACKET PRODUCED FROM TWO OVER-MOULDED PARTS

The present invention relates to a rotary electrical machine provided with a bracket produced from two over-moulded parts. The invention has a particularly advantageous, but non-exclusive application with high-power reversible electrical machines which can operate in alternator mode and in motor mode coupled to a reducer element.

In a known manner, rotary electrical machines comprise a stator and a rotor secured to a shaft. The stator is fitted in a housing which is configured to bear in rotation the shaft on brackets by means of bearings.

The rotor comprises a body formed by a stack of metal plate sheets which are retained in the form of a set by means of an appropriate securing system. The rotor comprises poles formed for example by permanent magnets accommodated in cavities provided in the magnetic mass of the rotor. Alternatively, in a so-called "salient" pole architecture, the poles are formed by coils wound around arms of the rotor.

In addition, the stator comprises a body constituted by a stack of thin metal plates forming a crown, the inner face of which is provided with notches open towards the interior in order to receive a winding. The winding is obtained for example from a continuous wire covered with enamel, or from conductive elements in the forms of pins connected to one another by welding. The winding comprises phase windings which are connected in the form of a star or a triangle, the outputs of which are connected to an electronic control module.

In certain types of motor vehicle traction chains which ensure the transmission of the mechanical power of the thermal engine to the wheels of the vehicle, a high-power reversible rotary electrical machine can be coupled to a reducer element. The reducer element can be in the form of a gearbox of the vehicle, or of a reducer which is fitted on a train of the vehicle, and is connected mechanically to the rotary electrical machine.

In order to ensure the coupling between the electrical machine and the reducer element, a pinion which is supported by the shaft of the electrical machine engages with a pinion which is supported by the reducer element via an intermediate pinion fitted on a bracket of the electrical machine. For this purpose, the bracket comprises an interface for fitting of the bearing of the intermediate pinion. Mechanical simulations of the operation of the system have revealed the presence of axial, radial and tangential forces which are difficult for the bracket to withstand, and in particular when the bracket is produced entirely from aluminium, which is not a strong material.

The objective of the present invention is to eliminate this disadvantage efficiently by proposing a rotary electrical machine, in particular for a motor vehicle, comprising:
a shaft;
a rotor fitted on the shaft;
a stator, in particular surrounding the rotor;
a bracket comprising a receptacle for receipt of a shaft bearing which ensures guiding of the shaft in rotation, characterised in that the bracket comprises:
a first part produced from a first material comprising:
the receptacle for receipt of the shaft bearing;
an interface for fitting of a bearing of a pinion external to the rotary electrical machine; and
a second part produced from a second material comprising:
a transverse wall; and
a skirt obtained from the transverse wall, surrounding the stator at least partly;
the second part being over-moulded on the first part such as to form a strong bracket.

The invention thus makes it possible to reinforce mechanically the area of the bracket comprising the support surfaces of the bearings for the pinion of the shaft of the electrical machine and the pinion engaged with the reducer element, in order to be able to withstand the forces sustained during the operation of the assembly.

According to one embodiment, the first part is produced from a material which is stronger than the material of the second part.

According to one embodiment, the first part is produced from steel.

According to one embodiment, the second part is produced from aluminium.

According to one embodiment, the fitting interface extends projecting in order to be inserted in the interior of an inner ring of the bearing of the corresponding pinion.

According to one embodiment, the receptacle for receipt of the shaft bearing of the first part is configured to receive an outer ring of the shaft bearing.

According to one embodiment, the first part comprises an alternation of ribs and recesses on its rear face.

According to one embodiment, the transverse wall is provided with openings for the passage of ends of phases of the stator.

The invention also relates to an assembly comprising a rotary electrical machine as previously defined.

According to one embodiment, the reducer element is a motor vehicle gearbox.

According to one embodiment, the reducer element is a reducer which is fitted on a train of the vehicle, and is coupled to the rotary electrical machine.

The invention will be better understood by reading the following description and examining the figures which accompany it. These figures are provided purely by way of illustration of the invention which is in no way limiting.

Elements which are identical, similar or analogous retain the same reference from one figure to another.

Hereinafter in the description, an orientation from the front to the rear is considered to be an orientation going from left to right in FIG. 2. Thus, a "front" element means an element which is situated on the side of the front bearing 19, and a "rear" element means an element which is situated on the opposite side.

Figure 1:
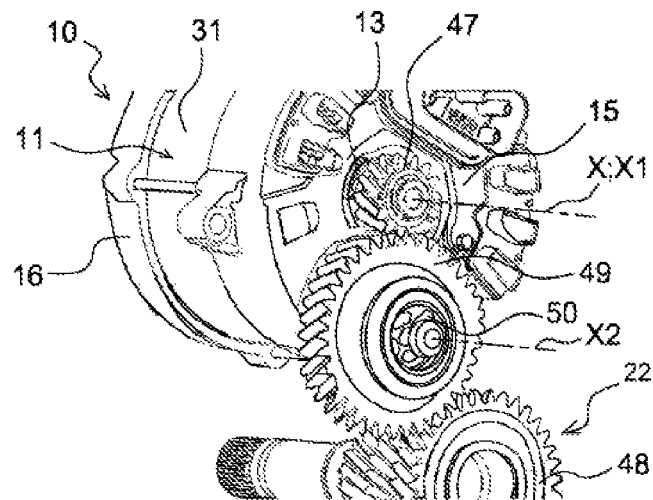
FIG. 1 is a view in perspective illustrating the coupling between a reducer element and the rotary electrical machine according to the present invention.
Figure 2:
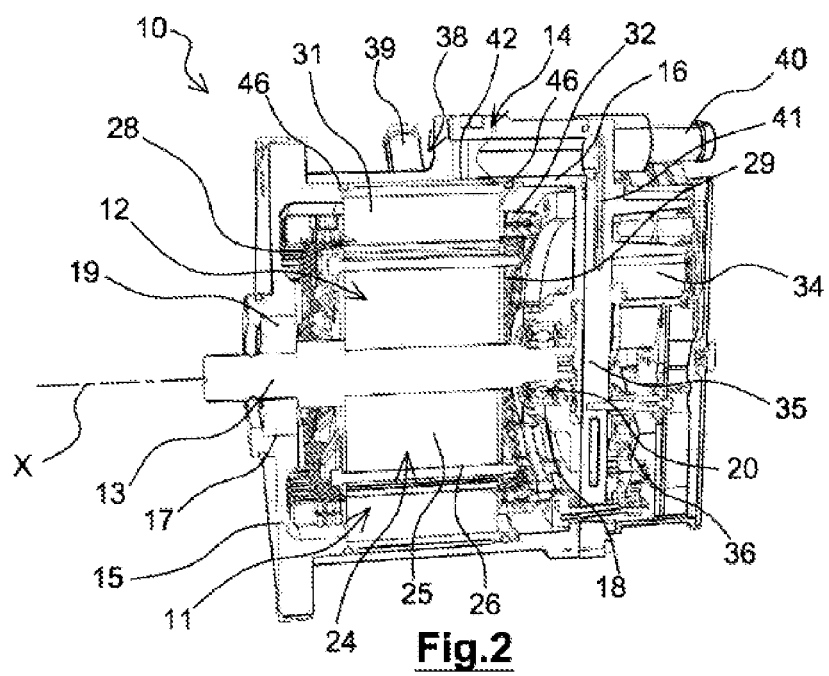
FIG. 2 is a view in longitudinal cross-section of the rotary electrical machine according to the invention.

FIGS. 1 and 2 show a rotary electrical machine 10 comprising a polyphase stator 11 surrounding a rotor 12 fitted on a shaft 13 with an axis X corresponding to the axis of the electrical machine 10. The stator 11 surrounds the rotor 12 with the presence of an air gap between the inner periphery of the stator 11 and the outer periphery of the rotor 12. The stator 11 is fitted in a housing 14 comprising a front bracket 15 and a rear bracket 16. The front bracket 15 and the rear bracket 16 each comprise a receptacle 17, 18 for receipt of a corresponding bearing 19, 20 which ensures guiding of the shaft 13 in rotation.

This electrical machine 10 is designed to be coupled to a speed reducer element 22. The reducer element 22 can be in the form of a motor vehicle gearbox or a reducer which is fitted on a train of the vehicle and is coupled to the rotary electrical machine 10.

The electrical machine 10 can operate in an alternator mode, in particular in order to supply energy to the battery and to the on-board network of the vehicle, and in a motor mode, in order to ensure the starting of the thermal engine of the vehicle, and if applicable to participate in the traction of the vehicle, alone or in combination with the thermal engine. The power of the machine can for example be comprised between 15 kW and 50 kW.

More specifically, as can be seen in FIG. 2, the rotor 12 comprises a body 24 in the form of a set of metal plates. Permanent magnets 25 are implanted in cavities 26 in the body 24. The magnets 25 can be made of rare earth or ferrite according to the applications and the power required from the electrical machine 10.

In addition, the rotor 12 comprises two flanges 28, 29, which are each placed against an axial end face of the rotor 12. These flanges 28, 29 ensure axial retention of the magnets 25, and are also used to balance the rotor 12.

In addition, the stator 11 comprises a body 31 constituted by a set of metal plates, as well as a winding 32. The body 31 is formed by a stack of metal plate sheets, which are retained in the form of a set by means of an appropriate securing system, such as rivets.

The stator body 11 is provided with teeth delimiting notches for fitting of the winding 32. The winding 32 comprises an assembly of phase windings passing through the notches and forming chignons extending projecting on both sides of the stator body 11. In this case, the winding 32 is obtained from conductive elements in the form of pins which are connected to one another for example by welding. The winding 32 comprises phase windings of the double three-phase type connected in the form of a star and/or a triangle. Phase outputs are designed to be connected to an electronic control module 34.

The electronic control module 34 comprises a heat dissipater 35, on which power modules 36 in particular are secured, for example by screwing. These power modules 36 incorporate in a known manner switches, which for example are in the form of transistors of the MOS type, making it possible to ensure control of the phases of the rotary electrical machine 10 in motor mode or in alternator mode. The switching of these transistors is controlled by a control unit. The electronic control module 34 is fitted placed, via the heat dissipater 35, against the rear face of a transverse wall of the rear bracket 16.

Advantageously, the electrical machine 10 comprises a cooling circuit 38 with an input 39 and an output 40 for cooling liquid, such as a liquid based on water or oil. The cooling circuit 38 has a cooling chamber 41 provided in the mass of the heat dissipater 35, and a cooling chamber 42 surrounding the stator 11.

The cooling chamber 42 can be delimited by the outer periphery of an annular wall of the front bracket 15, and the inner periphery of an annular wall of the rear bracket 16. This cooling chamber 42 is closed at its axial ends by two seals 46 of the O-ring type. The stator 11 is fitted shrunk in the interior of the front bracket 15, such as to establish close contact between the outer periphery of the stator body 31 and the inner periphery of the lateral wall of the front bracket 15.

As a variant, the stator 11 is fitted clamped between the front bracket 15 and the rear bracket 16 by means of securing tie rods, as shown in FIG. 1. The bare outer periphery of the stator body 31 can be directly in contact with a cooling liquid.

As can be seen in FIG. 1, in order to ensure coupling between the electrical machine 10 and the reducer element 22, a pinion 47, which is supported by the shaft of the electrical machine 10 engages with a pinion 48 which is supported by the reducer element 22 via an intermediate pinion 49 fitted on the front bracket 15. For this purpose, the front bracket 15 comprises an interface 51 for fitting of a bearing 50 of the intermediate pinion 49 external to the electrical machine 10.

Figure 3:
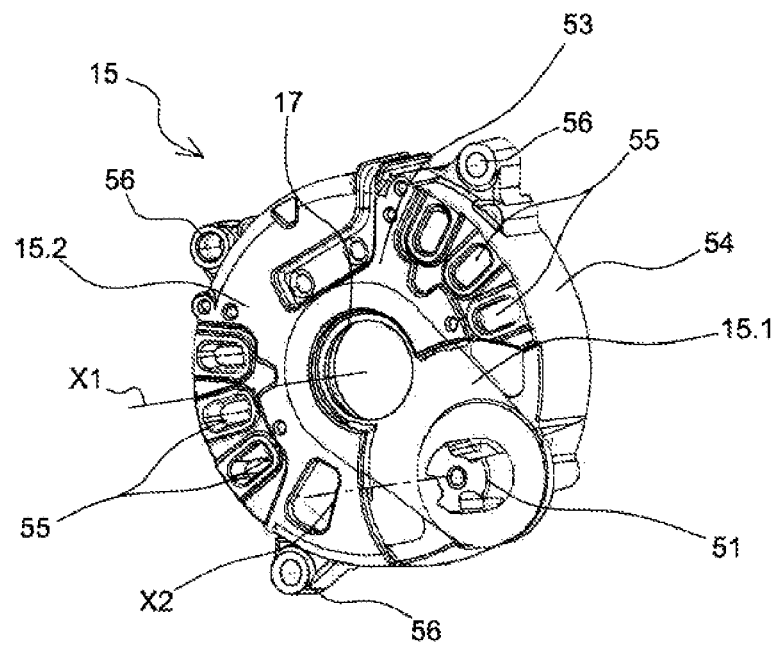
FIG. 3 is a view in perspective of the front bracket in two parts of the rotary electrical machine according to the invention.

As shown in FIG. 3, the front bracket 15 is formed by a first part 15.1 and a second part 15.2, which is over-moulded on the first part 15.1 such as to form a bracket 15. The first part 15.1 is advantageously produced from a material which is stronger than the material of the second part 15.2. According to a preferred embodiment, the first part 15.1 is produced from steel, whereas the second part 15.2 is produced from aluminium.

Figure 4A:
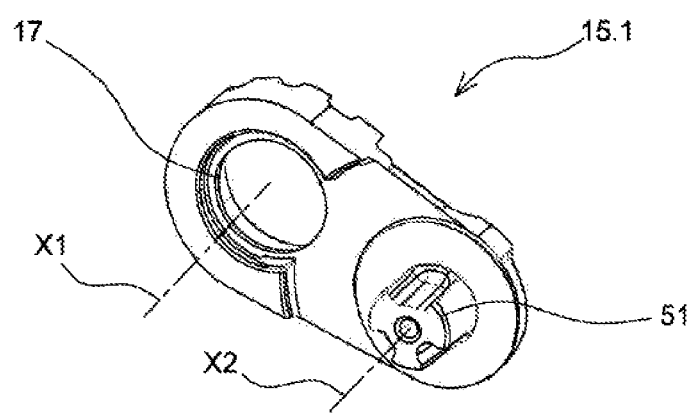
FIGS. 4a and 4b are views in perspective of the first part forming the front bracket of the rotary electrical machine according to the invention.
Figure 4B:
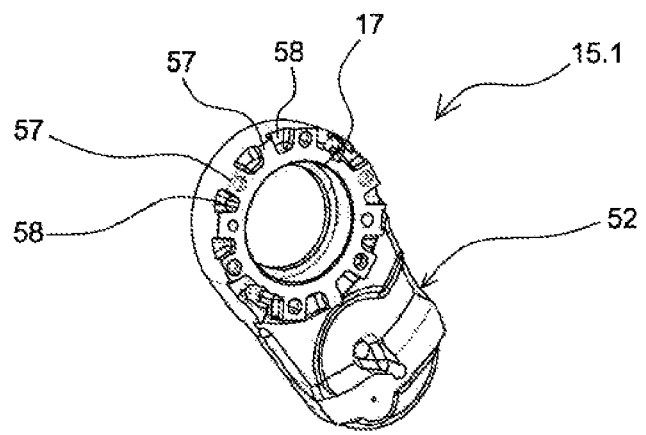

More specifically, as can be seen in FIGS. 4a and 4b, the first part 15.1 comprises the receptacle 17 for receipt of the shaft bearing 19, and the interface 51 for fitting of the bearing 50 of the intermediate pinion 49.

In this embodiment, the receptacle 17 for receipt of the first part 15.1 is configured to receive an outer ring of the shaft bearing 19. The fitting interface 51 extends projecting in order to be inserted in the interior of an inner ring of the bearing 50 of the intermediate pinion 49. As a variant, the fitting interface 51 can comprise a receptacle for receipt of the outer ring of the bearing 50 of the intermediate pinion 49.

The fitting interface 51 is offset radially relative to the receptacle 17 for receipt of the bearing. An axis X1 of the receptacle 17 corresponding to the axis of the bracket 15 is parallel to an axis X2 of the fitting interface 51. The axis X1 is designed to be combined with the axis X of the rotary electrical machine 10.

Figure 5:
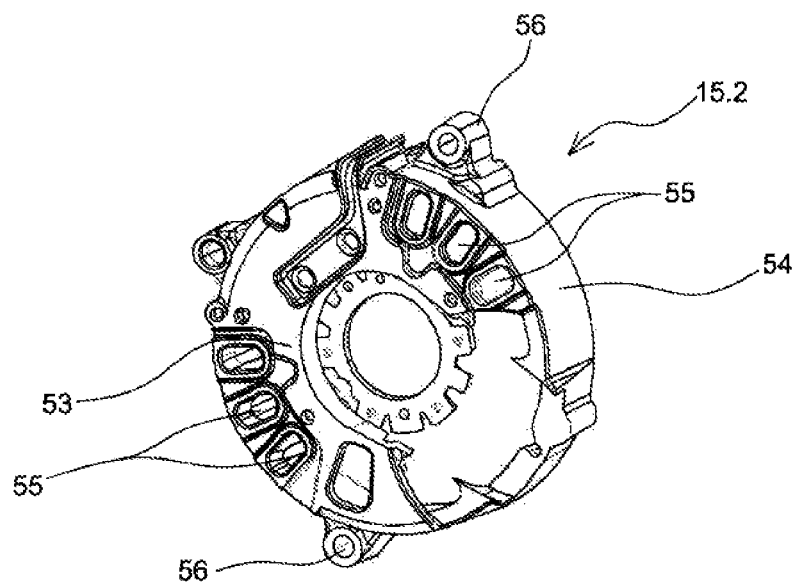
FIG. 5 is a view in perspective of the second part forming the front bracket of the rotary electrical machine according to the invention.

As illustrated by FIG. 5, the second part 15.2 comprises a transverse wall 53, and a skirt 54 obtained from the transverse wall 53, surrounding the stator 11 at least partly. The transverse wall 53 can be provided with openings 55 for the passage of ends of phases of the stator. The skirt 54 comprises radially projecting ears 56 which are provided with openings for passage of securing units.

On its rear face, the first part 15.1 preferably comprises an alternation of ribs 57 and recesses 58, as shown in FIG. 4b. These ribs 57 and these recesses 58 are placed around the receptacle 17 for receipt of the bearing 19. These forms are intended to improve the mechanical connection between the first part 15.1 and the second part 15.2 of the bracket 15, by maximising the contact surfaces between these two parts 15.1, 15.2.

It will be appreciated that the foregoing description has been provided purely by way of example, and does not limit the scope of the invention, a departure from which would not be constituted by replacing the different elements by any other equivalents.

In addition, the different characteristics, variants, and/or embodiments of the present invention can be associated with one another according to different combinations, provided that they are not incompatible or mutually exclusive.

The invention claimed is:

1. A rotary electrical machine for a motor vehicle, comprising:
   a shaft;
   a rotor fitted on the shaft;
   a stator surrounding the rotor;
   a bracket comprising a receptacle for receipt of a shaft bearing which ensures guiding of the shaft in rotation, wherein the bracket comprises:
   a first part produced from a first material comprising:
      the receptacle for receipt of the shaft bearing;
      an interface for fitting of a bearing of a pinion external to the rotary electrical machine; and
   a second part produced from a second material comprising:
      a transverse wall; and
      a skirt obtained from the transverse wall, surrounding the stator at least partly;
   the second part being over-moulded on the first part such as to form a strong bracket.

2. The rotary electrical machine according to claim 1, wherein the first part is produced from a material which is stronger than the material of the second part.

3. The rotary electrical machine according to claim 1, wherein the first part is produced from steel.

4. The rotary electrical machine according to claim 1, wherein the second part-is produced from aluminium.

5. The rotary electrical machine according to claim 1, wherein the fitting interface extends projecting in order to be inserted in the interior of an inner ring of the bearing of the corresponding pinion.

6. The rotary electrical machine according to claim 1, wherein the receptacle for receipt of the shaft bearing of the first part is configured to receive an outer ring of the shaft bearing.

7. The rotary electrical machine according to claim 1, wherein the first part comprises an alternation of ribs and recesses on its rear face.

8. The rotary electrical machine according to claim 1, wherein the transverse wall is provided with openings for the passage of ends of windings of the stator.

9. An assembly comprising:
   a rotary electrical machine as defined according to claim 1 and a reducer element.

10. The assembly according to claim 9, wherein the reducer element is a motor vehicle gearbox.

11. The assembly according to claim 9, wherein the reducer element is a reducer which is fitted on a train of the vehicle, and is coupled to the rotary electrical machine.

* * * * *